United States Patent
Digman

(10) Patent No.: US 11,304,368 B2
(45) Date of Patent: Apr. 19, 2022

(54) APPARATUS FOR ASSESSING AND HARVESTING PEAS

(71) Applicant: Wisconsin Alumni Research Foundation, Madison, WI (US)

(72) Inventor: Matthew Digman, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 189 days.

(21) Appl. No.: 16/869,235

(22) Filed: May 7, 2020

(65) Prior Publication Data
US 2021/0345547 A1 Nov. 11, 2021

(51) Int. Cl.
| | | |
|---|---|---|
| *A01D 41/127* | (2006.01) | |
| *A01D 41/12* | (2006.01) | |
| *A01D 45/24* | (2006.01) | |
| *G01N 21/85* | (2006.01) | |
| *G01N 21/84* | (2006.01) | |

(52) U.S. Cl.
CPC ..... *A01D 41/1277* (2013.01); *A01D 41/1208* (2013.01); *A01D 45/24* (2013.01); *G01N 21/85* (2013.01); *G01N 2021/8466* (2013.01); *G01N 2021/8592* (2013.01)

(58) Field of Classification Search
CPC ............ A01D 41/1277; A01D 41/1208; A01D 45/24; G01N 21/85; G01N 2021/8592; G01N 2021/8466; G01N 33/02; A23N 15/10
See application file for complete search history.

(56) References Cited

U.S. PATENT DOCUMENTS

| | | | | |
|---|---|---|---|---|
| 5,039,534 A | * | 8/1991 | Adams | B03B 5/62 426/231 |
| 5,360,118 A | * | 11/1994 | Kempf | B03B 5/442 209/172.5 |
| 5,718,629 A | * | 2/1998 | Davenport | A01D 45/24 460/131 |
| 6,483,583 B1 | * | 11/2002 | Wright | G01J 3/02 356/326 |
| 6,845,326 B1 | * | 1/2005 | Panigrahi | G01J 3/02 250/339.02 |
| 7,367,880 B2 | * | 5/2008 | Hoskinson | A01D 41/1271 460/5 |
| 7,449,206 B2 | * | 11/2008 | Moser | A23B 7/06 426/481 |
| 2016/0207071 A1 | * | 7/2016 | Cohn | G01N 21/251 |
| 2020/0139409 A1 | * | 5/2020 | Berghmans | G01N 21/55 |

(Continued)

OTHER PUBLICATIONS

Rawsthorne "Calibration of the pea tenderometer and a comparison of tenderometer readings from three countries." Journal of Texture Studies 7, No. 2 (1976): pp. 263-270. Sweden.

(Continued)

*Primary Examiner* — Alicia Torres
*Assistant Examiner* — Matthew Ian Neal
(74) *Attorney, Agent, or Firm* — Boyle Fredrickson, S.C.

(57) ABSTRACT

Measurements of pea tenderness comparable to those provided by mechanical tenderometers are provided through analysis of an infrared spectrum of shelled peas. These measurements may be output directly or used to control real time harvesting of peas to prevent mixing of peas with different tenderness values.

17 Claims, 4 Drawing Sheets

(56) References Cited

U.S. PATENT DOCUMENTS

2021/0123861 A1* 4/2021 Voisin ............... G01N 21/6486

OTHER PUBLICATIONS

Kjolstad et al. "Prediction of sensory quality by near infrared reflectance analysis of frozen and freeze dried green peas (*Pisum sativum*)." Journal of the Science of Food and Agriculture 51, No. 2 (1990): pp. 247-260. Norway.

Chalucova et al. "Determination of green pea maturity by measurement of whole pea transmittance in the NIR Yegion." LWT—Food Science and Technology 33, No. 7 (2000): pp. 489-498. UK.

Varseveld "The determination of raw pea grade by tenderometer: a review." Special Report 236; Agricultural Experiment Station; Oregon State University; Corvallis, Oregon; pp. 1-22 ; (May 1967).

\* cited by examiner

APPARATUS FOR ASSESSING AND HARVESTING PEAS

STATEMENT REGARDING FEDERALLY SPONSORED RESEARCH OR DEVELOPMENT

Cross Reference to Related Application

Background of the Invention

The present invention relates to pea tenderometry for measuring the maturity of peas and in particular to an apparatus using infrared spectroscopy to assess pea maturity and to control harvesting thereof.

The fresh and canned vegetable markets for green peas (*Pisum sativum*) demand a high yield and high-quality product which both are highly dependent on harvest maturity. To ensure quality and yield targets are met, a pre-grading process is utilized by most harvesting crews. Each day, teams of crop scientists collect peas from the field to monitor the progression of yield and quality. The typical process includes gathering samples by hand, separating peas from the vines through a stationary viner, shelling, cleaning on a vibrating sorting table, and washing. The harvested mass and size distribution are noted, and the maturity is assessed using a tenderometer.

A tenderometer measures the force needed to shear and press a sample of peas through a standard grid and at a specific shear rate. As hardness (maturity) increases so, too, does the force needed to shear the samples. The hardness, or inversely tenderness, of the peas is expressed as tenderometer reading. Lower tenderness peas are more valuable than higher tenderness peas.

Once a decision has been made to start harvesting, specialized pea harvesting equipment may pass through the fields removing pea vines, separating the peas from the shells, and collecting the peas in hoppers that may hold up to 4000 pounds of peas. During the harvesting process, these hoppers are periodically emptied into transporting trucks to be rapidly conveyed to pea processing plants to be frozen or canned. Ideally the harvesting and transfer process will be completed within two hours to ensure maximum pea quality.

It can be challenging to harvest peas at the proper maturity. Reliance on a mechanical tenderometer practically limits the number of samples that can be acquired in the field even though different areas even within a single field may exhibit substantially different maturity rates. It is usually not practical to bring the harvesting equipment back for small areas of the field having a different ripening schedule. Harvesting equipment that passes into areas having overly mature peas can mix peas from those areas with peas have previously been harvesting resulting in the rejection of the entire hopper substantially reducing yields.

SUMMARY OF THE INVENTION

The present invention provides an apparatus for rapidly assessing pea tenderness in real time during the harvest process. Readings from an infrared spectrometer are mapped to tenderness readings which may be used either to assess ripeness directly and/or to control the harvesting equipment to prevent low-quality peas from contaminating an existing hopper, for example, by real-time diversion of the flow of peas in the harvester.

Specifically, in one embodiment, the invention provides a pea tenderometer having an infrared spectrometer providing an illumination source and a spectrally sensitive detector providing reflectance measurements in a near infrared range extending above and below 1100 nm. A stage is positioned with respect to the infrared spectrometer for receiving shelled peas for reflectance measurements of the peas by the infrared spectrometer, and an analyzer receives signals from the spectrally sensitive detector at multiple frequency bands above and below 1100 nm and applies a weighting to those multiple frequency bands according to a predefined weighting system to produce an output indicating pea tenderness. The frequency bands may, for example, include 980 nm and 1474 nm.

It is thus a feature of at least one embodiment of the invention to provide a more robust measurement of pea tenderness by including longer wavelength infrared frequencies that comprise only a small portion of the reflected energy.

The weighting maybe determined empirically using regression to values of a mechanical pea tenderometer. In one embodiment the output may be in Food Technology Corporation Tenderometer Units (TUs).

It is thus a feature of at least one embodiment of the invention to provide an output that may be directly compared to tenderometers that may be used by third parties, for example, a canning company, for assessing field conditions.

In one embodiment, the invention may provide a pea harvesting machine having a wheeled chassis adapted to traverse an agricultural field growing peas and supporting a harvester mechanism for removing peapods from the field and separating the peas from the peapods to provide a flow of peas isolated from pods. An infrared spectrometer may be positioned along the flow of peas to provide measurements of the flow of peas in a near infrared range extending above and below 1100 nm, and an analyzer may receive signals from the spectrally sensitive detector at multiple frequency bands and apply a weighting to those multiple frequency bands according to a predefined weighting system to produce an output indicating pea tenderness. The harvester may include a diverter controlled by the analyzer to control the flow of peas into a predetermined bin only when the analyzer indicates a predetermined desired range of pea tenderness.

It is thus a feature of at least one embodiment of the invention to reduce the risk of mixing peas of different ripenesses such as could contaminate an entire load requiring the disposal of those peas. It is another feature of at least one embodiment of the invention to accommodate the reality of different stages of ripeness in a given field to provide improved harvesting efficiency.

The diverter may further be controlled by the analyzer to divert peas into a second predetermined bin when only the analyzer indicates the peas do not have the predetermined desired range of pea tenderness.

It is thus a feature of at least one embodiment of the invention to allow multi-ripeness harvesting, for example, for frozen or canned peas and soup peas, providing more efficient equipment and land use.

The pea-harvesting machine may include an operator cab having a display providing a real-time indication of pea tenderness from the analyzer based on the measurements from the infrared spectrometer.

It is thus a feature of at least one embodiment of the invention to allow real-time monitoring of harvesting allowing the operator to better assess an efficient harvesting pattern.

The pea-harvesting machine may further include a location sensing system providing a location of the wheeled chassis, and the display may provide a real-time mapping of the location of the harvesting machine with respect to a field map having superimposed pea tenderness values on the field map.

It is thus a feature of at least one embodiment of the invention to allow the operator to get closer to areas of undesirably ripened peas without passing into those areas by providing improved spatial understanding of the field with respect to ripeness.

The pea-harvesting machine may further include a stage positioned with respect to the infrared spectrometer for receiving the flow of peas within a channel having a transparent wall and wherein the infrared spectrometer is positioned to make reflection measurements of the flow of peas through the transparent wall.

It is thus a feature of at least one embodiment of the invention to provide a mechanism for corralling flowing peas for reliable spectroscopy measurement.

These particular objects and advantages may apply to only some embodiments falling within the claims and thus do not define the scope of the invention.

DETAILED DESCRIPTION OF THE PREFERRED EMBODIMENT

Figure 1:
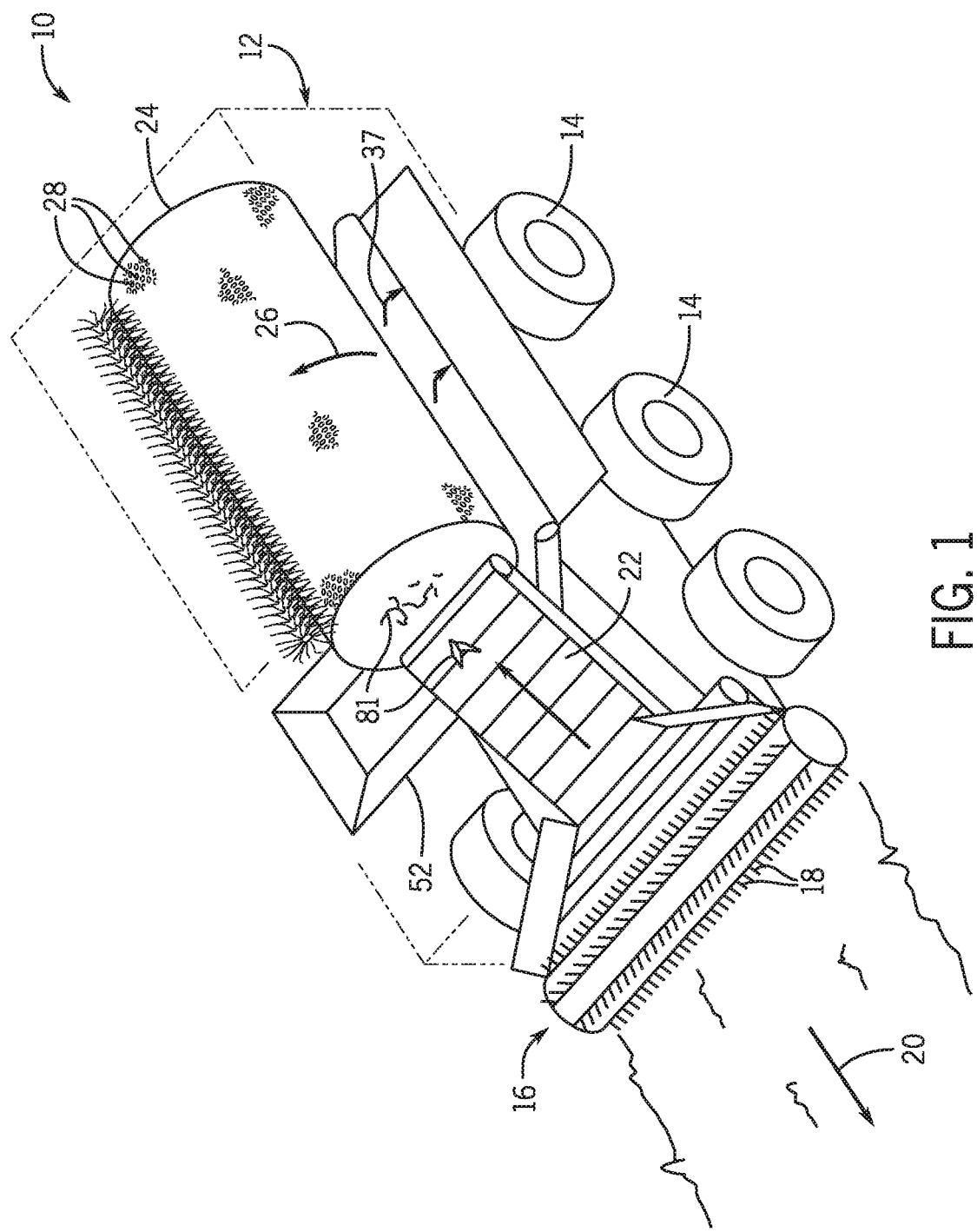
FIG. 1 is a phantom view of the pea harvesting machine suitable for use with the present invention showing a header for picking the peas from the field and conveying them to a drum separating the peas from the pods.

Referring now to FIG. 1, a pea-harvesting machine 10 may provide for a motorized chassis 12 having wheels or tracks 14 adapted for travel through soft agricultural fields for pea harvesting. The front of the pea-harvesting machine 10 may provide for a rotating header reel 16 with outwardly extending prongs 18 passing over the ground in a direction opposite the travel direction 20 of the pea-harvesting machine 10 to draw pods and vine fragments upward to be deposited on a conveyor belt 22. The conveyor belt 22 discharges the vine fragments and pods into an open end of a horizontally supported separator drum 24 rotating about a horizontal axis as indicated by arrow 26. The outer circumference of the separator drum 24 has perforations 28 distributed over its surface and sized to preferentially allow the passage of peas but not pods or other vine fragments.

Figure 2:
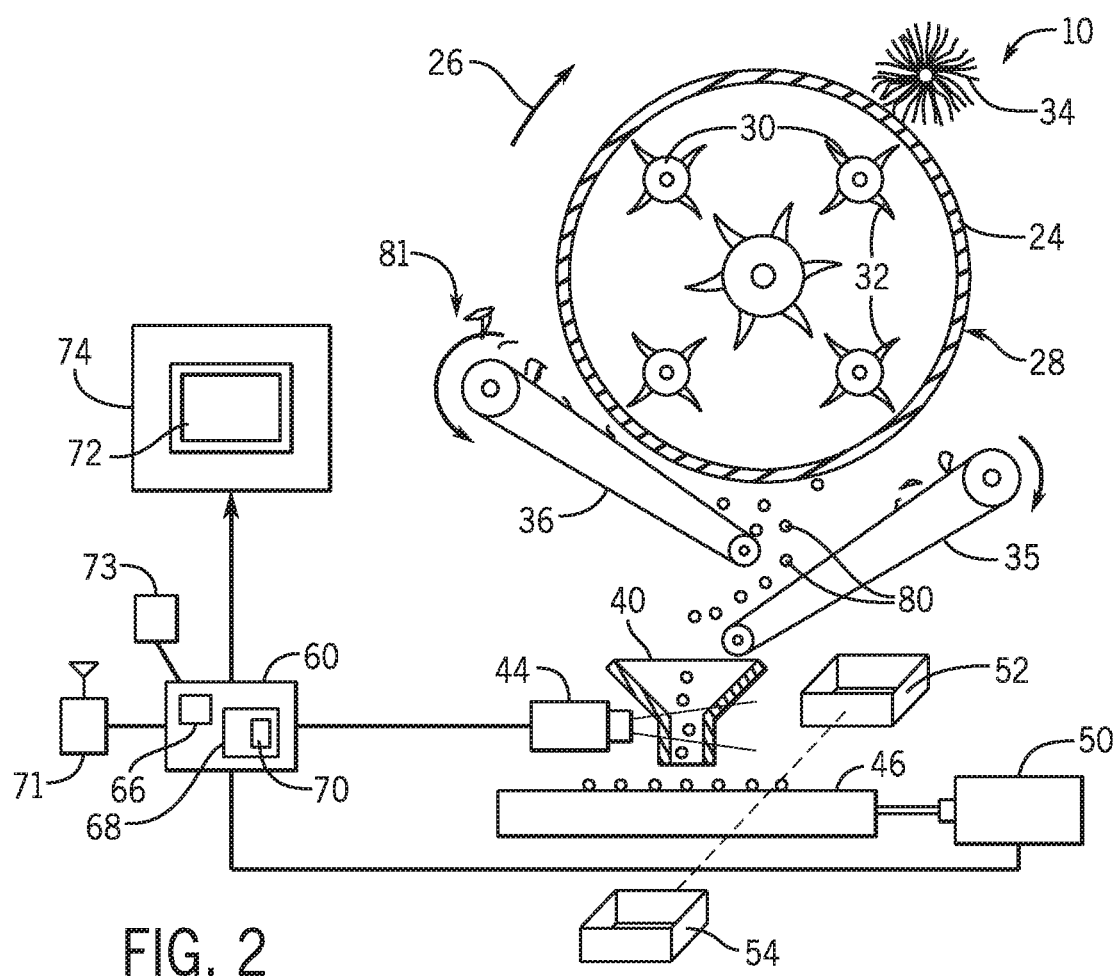
FIG. 2 is a schematic elevational cross-section through the drum of FIG. 1 showing internal beaters for removing the peas from the pods and conveyors for separating the empty pods from the peas and further showing the location of a spectrometer for monitoring pea ripeness, a diverter system, and an operator cab control panel.

Referring also to FIG. 2, inside the separator drum 24 a set of rotating beaters 30 rotates about axes aligned with the axis of the drum 24 but spaced apart therefrom. The rotating beaters 30 each have outwardly extending beater fingers 32 which strike the pods 81 to separate the peas 80 from the pods 81, the latter of which may then fall through the perforations 28. A rotating brush 34 on the outer surface of the drum 24 helps dislodge vine fragments and pods 81 that would otherwise clog the perforations 28.

Vine fragments and pods 81 generally travel rearwardly along the axis of the drum 24 to fall out of its rear open end promoted by a slight sloping of the axis of the drum 24. Some fragments from the vines and pods 81 may fall through the perforations 28 and drop down together with the peas 80 to be captured on two vertically overlapping conveyors 35 and 36 arranged in an upwardly open V therebelow. These overlapping conveyors 35 and 36 have upper surfaces that move upwardly and outwardly to the left and right side of the pea-harvesting machine 10. Generally the peas 80 will roll downward on these conveyors 35 and 36 toward a vertical gap between the conveyors 35 and 36 near the bottom of the V while the fragments of the vines and pods 81 will be carried up on the conveyors 35 and 36 and discharged as indicated by arrows 37 (with respect to conveyor 36) into the field.

Example harvesters providing these elements are manufactured and commercially available from PMC Harvesters Limited of Norfork, England.

The peas 80 removed from the pods 81 may be received by a funnel 40 having a transparent narrow neck 42 which aligns the peas in a falling column to be scanned by a spectrometer 44 as they drop onto a conveyor belt 46. The conveyor belt 46 may be driven by a motor 50 to move the peas 80 either to a first harvest bin 52 or to rotate in the opposite direction to discharge the peas 80 onto the field or to a second bin 54 as will be discussed below.

The spectrometer 44 may make real time measurements of the reflection from the peas 80 in multiple near-infrared bands and communicate these measurements with an analyzer 60. The analyzer 60 may have one or more processors 66 communicating with the computer memory 68 holding a stored program 70 that will assess the tenderness of the peas as will be discussed below. The analyzer 60 may also communicate with a radio transmitter 71 for transmitting information from the pea-harvesting machine 10 with a central location and with a console display 72 in the cab 74 of the pea-harvesting machine 10 where the operator sits for steering and controlling the pea-harvesting machine 10. In addition, the analyzer 60 may communicate with a location sensor 73, for example, a GPS system, cell tower triangulation system, or beacon-based system as is generally understood in the art.

The spectrometer 44 as noted, may make real-time measurements of pea tenderness as the peas 80 fall through the neck channel 42 of the funnel 40. The neck channel 42 is sized to collect the peas together to provide a strong infrared reflection signal and may provide for a transparent wall, for example, 5 mm of glass, through which measurements may be made by the spectrometer 44. Infrared measurements from the spectrometer 44 in multiple frequency bands will then be analyzed by the analyzer 60 for the pea tenderness measurements that will be used for multiple purposes including real-time guidance to the operator of the pea-harvesting machine 10 and controlling the binning of peas.

In this latter regard, output from the analyzer 60 may be used to control the motor 50 communicating with the conveyor 46 onto which the peas 80 fall after analysis by the spectrometer 44. Controlling the motor 50 allows the pea-harvesting machine 10 to either move the peas to a harvest bin 52 when the motor moves in a first direction or alternatively move the peas 82 to a second bin 54 or, when a bin is not present, onto the field when the motor moves in the opposite direction. Generally, the harvest bin 52 may hold approximately 4000 pounds of peas for later transfer to a truck to be sent to a canning or freezing plant. Peas 80 that are not ripe are diverted from the harvest bin 52 to prevent contamination that might require discarding of all of the peas 80 in the harvest bin 52. These diverted peas may either be discarded or, in the case when the peas 80 are overripe, diverted to a secondary use, for example, as soup peas.

Figure 3:
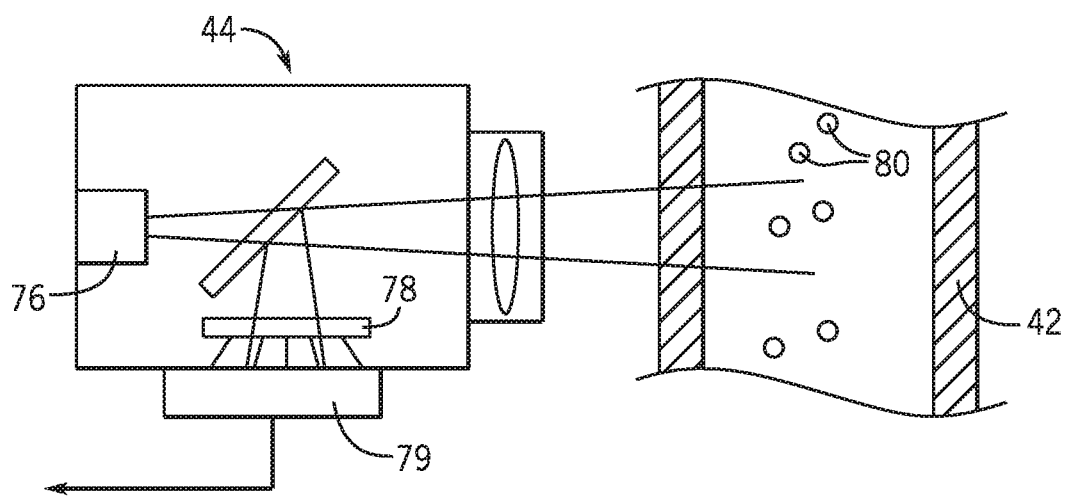
FIG. 3 is a schematic diagram of the spectrometer of FIG. 3 suitable for making measurements and multiple frequency bands and conveying them to a processor for evaluation.

Referring now to FIG. 3, the spectrometer 44 may provide an illumination bulb 76, for example, outputting a broad-spectrum near infrared source such as provided by a 20 W halogen bulb. This bulb 76 may illuminate the peas 80 as they fall through the neck 42 of the funnel 40 described above so that the spectrometer 44 receives light reflected back from the peas 80. This light passes through a diffraction grating 78 operating like a prism to divide the light into different frequency bands of a near-infrared spectrum ranging from 950 to 1530 nm with a resolution of 2 nm. The detection of light so separated by the diffraction grating 78 may be provided by an array of near-infrared indium gallium arsenide (InGaAs) photodiodes 79 providing a spectral resolution of 2 to 3 nm per pixel and less than 7 nm full width at half maximum (FWHM) and offering a wavelength accuracy of less than 0.6 nm within a range of 1100 nm to 1300 nm. Spectrometers suitable for this purpose are available under the trade name of HarvestLab™ from John Deere as manufactured by Carl Zeiss; Jena, Germany. It will be understood that different designs of analyzer 60 may be used including those with filtered detectors or filtered light sources instead of diffraction grating 78, with and without a beam splitter, and the like.

Figure 4:
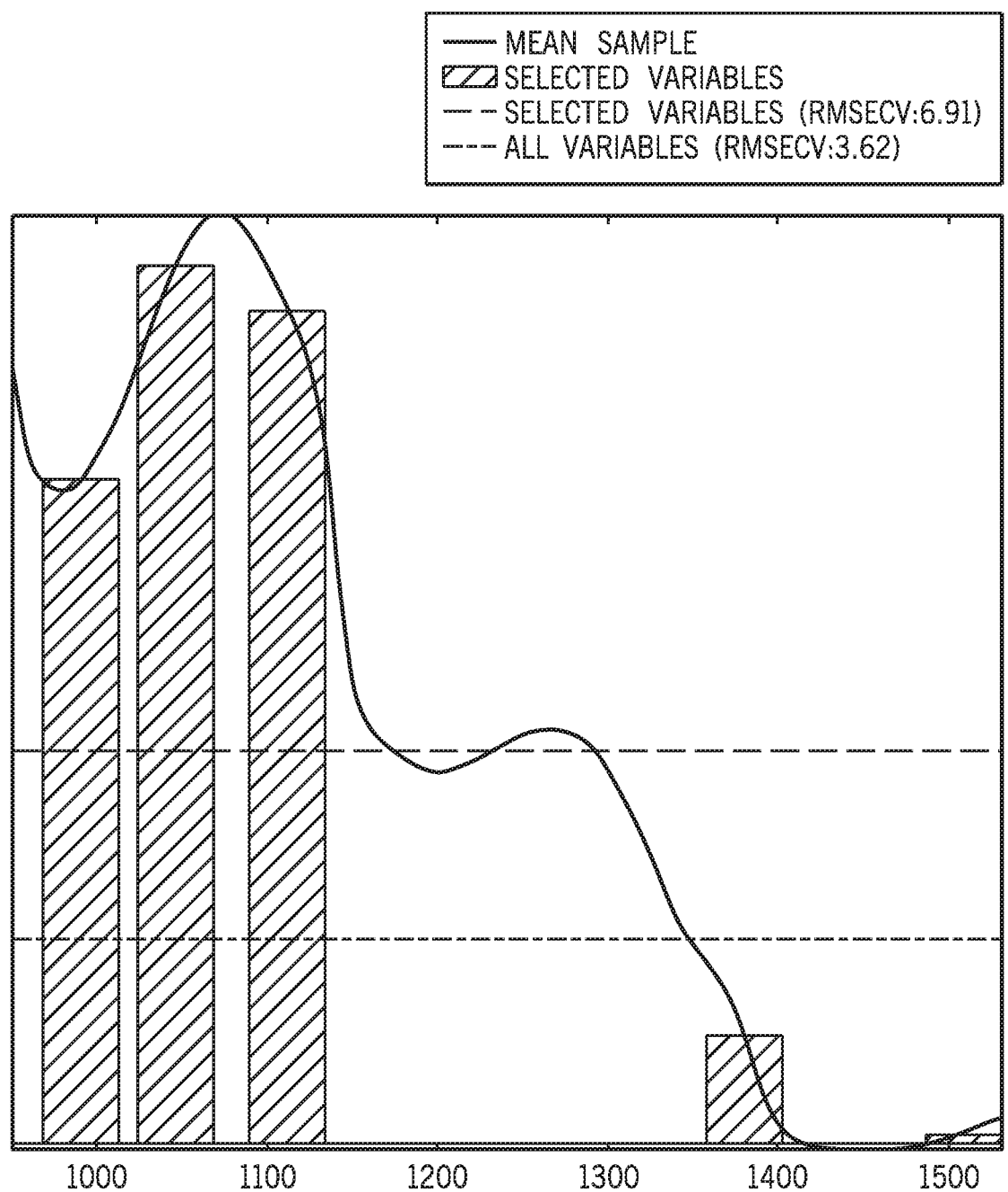
FIG. 4 is a spectrum showing reflection frequencies for properly ripened peas used to deduce pea tenderness in the present invention.

Referring now to FIG. 4, information collected by the spectrometer 44 in multiple frequency bands is then weighted and combined using a model to provide output related to pea tenderness. Ideally this output is in tenderometer units, for example, matching those produced by Model TG4-D Texturegage pea tenderometer commercially available from Food Technology Corporation, Sterling, Va., using the standard shear compression test cell (model CS-1) and stroke speeds of 30 seconds and defining TU (tenderness units).

This model relating the spectral measurements to TU values may be developed in a variety of ways including, for example, through the use of linear regression or support vector machine modeling trained using samples from the field compared against a commercial mechanical tenderometer. Analysis by the inventors has determined that near infrared wavelengths in a range from 950 to 1650 nm and on both sides of 1100, nm provide superior correlation to tenderometer readings. Preferably these frequency bands include frequency bands centered around 980, 1050, 1096, 1382, and 1574 nm and having a width of approximately 50 nm. The values of reflected light in these frequency bands for peas of a desired tenderness is depicted in FIG. 4 that shows the predominance of reflected light being at wavelengths less than 1200. Notably, however, the inventors have determined that frequencies including the wavelengths of 1382 and 1474, although comprising a relatively small amount of the returned light energy are important for a robust conversion to pea tenderness values. Preferably then, at least each of these frequency bands centered around wavelengths of 980, 1050, 1096, 1382, and 1574 nm will be fit by the model to corresponding TU values.

Figure 5:
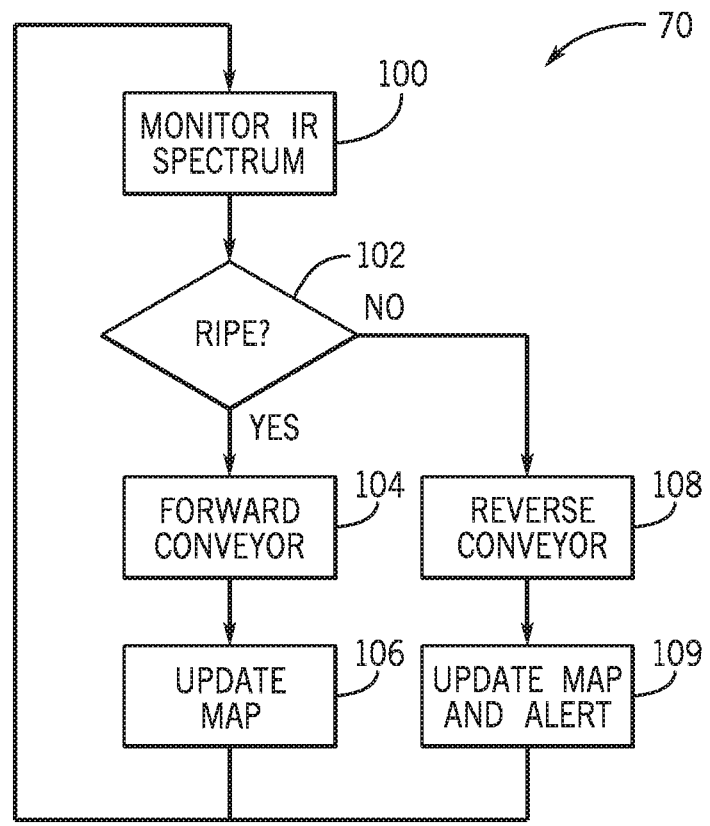
FIG. 5 is a flowchart of a program executed by the processor FIG. 2 to control the binning of peas in real time on the harvesting machine.

Referring now to FIGS. 2 and 5, the program 70 of the analyzer 60 of FIG. 2 may operate starting at process block 100 to provide current real-time monitoring of the peas 80 passing through the funnel 40 and applying the monitored values to the developed model to assess pea ripeness. Next, at decision block 102, if the peas 80 are considered to be of the desired ripeness (within a predetermined ripeness range that may be set by the user), at process block 104, conveyor belt 46 is operated in a forward direction as driven by motor 50 to discharge the peas 80 into the harvest bin 52. The evaluated ripeness of process block 100 is then, per process block 106, used to provide information to the display 72 to guide the operator of the pea-harvesting machine 10 and transmitted to a remote location for further processing. That processing may include the updating of a map on the display 72 indicating the ripeness of the peas 80 and providing a real-time ripeness indication as to be discussed below.

If at decision block 102 the peas 80 are considered to be outside of desired ripeness, at process block 108, the conveyor belt 46 may be reversed through the motor 50 to discharge the measured peas 80 into a second bin 54 or if no secondary bin 54 is present, into the field. In this case, at process block 109, the map on the display 72 is updated to indicate that the pea-harvesting machine 10 has moved into an area of the field with peas 80 that do not have the desired ripeness and an alert may be provided to the operator to allow guiding of the pea-harvesting machine 10 in the most efficient manner. This information may also be transmitted for remote use through the transmitter 71.

Figure 6:
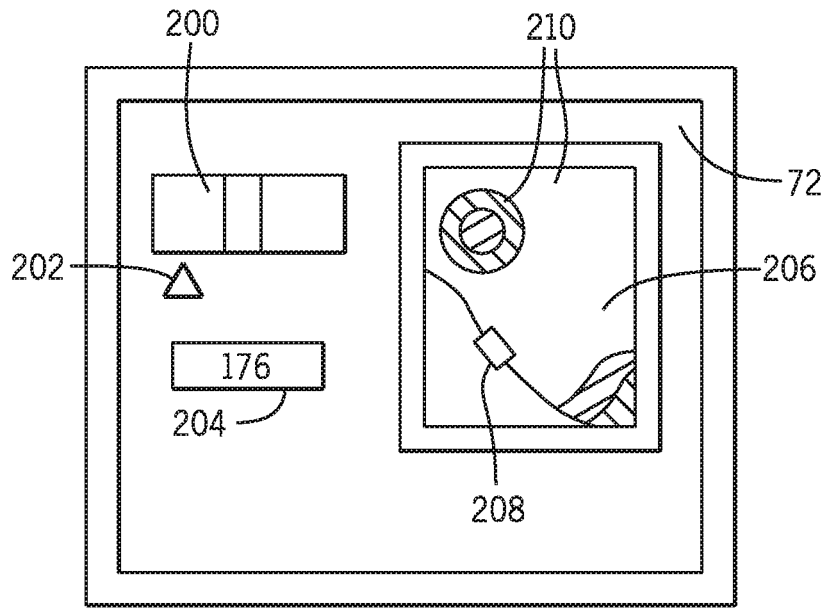
FIG. 6 is a screenshot of the cab control panel for providing real-time indication of pea tenderness and mapping regions in the field according to tenderness.

Referring now to FIG. 6, in one example, the display 72 may provide a real-time display of pea ripeness per bar gauge 200, for example, having a pointer 202 alignable with different regions of the bar gauge indicating ripeness or unsuitable ripeness (too mature or insufficiently mature). In situations where the peas 80 being currently harvested are outside of desired ripeness, the bar gauge 200 may be augmented with an alarm buzzer and separate visual display 204 to alert the operator.

Desirably the display 72 also includes a map 206 of the field that can show the location 208 of the pea-harvesting machine 10 and can provide shaded regions 210 indicating by shading in color or brightness the ripeness of the peas obtained by the pea-harvesting machine 10 at previously traversed locations 208. These regions can guide subsequent planting of peas and may allow the operator to avoid regions of the field with improperly ripened peas for more efficiency in use of the pea-harvesting machine 10 and to prevent contamination of the currently binned peas. The same information on the display 72 may be transmitted by the transmitter 71 to a remote location for central monitoring.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "controller" and "processor" should be understood to include one or more such devices that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What I claim is:

1. A pea tenderometer comprising:
   an infrared spectrometer providing an illumination source and a spectrally sensitive detector providing reflectance measurements in a near infrared range extending above and below 1100 nm;
   a stage positioned with respect to the infrared spectrometer for receiving shelled peas for reflectance measurements of the peas by the infrared spectrometer; and
   an analyzer receiving signals from the spectrally sensitive detector at multiple frequency bands above and below 1100 nm and applying a weighting to those multiple frequency bands according to a predefined weighting system to produce an output indicating pea tenderness.

2. The pea tenderometer of claim 1 wherein the frequency bands include 980 nm and 1474 nm.

3. The pea tenderometer of claim 1 wherein the frequency bands include 980, 1050, 1096 nm.

4. The pea tenderometer of claim 1 wherein the weighting is determined empirically using regression to values of a mechanical pea tenderometer.

5. The pea tenderometer of claim 4 wherein the output is Food Technology Corporation Tenderometer Units (TUs).

6. A pea-harvesting machine comprising:
   a chassis adapted to traverse an agricultural field growing peas;
   a harvester mechanism supported by the chassis for removing peapods from the field and separating the peas from the peapods to provide a flow of peas isolated from pods;
   an infrared spectrometer positioned along the flow of peas to provide measurements of the flow of peas in a near infrared range extending above and below 1100 nm;
   an analyzer receiving signals from the measurements at multiple frequency bands and applying a weighting to those multiple frequency bands according to a predefined weighting system to produce an output indicating pea tenderness; and
   a diverter controlled by the analyzer to control the flow of peas into a predetermined bin only when the analyzer indicates a predetermined desired range of pea tenderness.

7. The pea-harvesting machine of claim 6 wherein the diverter is further controlled by the analyzer to divert peas into a second predetermined bin only when the analyzer indicates the peas do not have the predetermined desired range of pea tenderness.

8. The pea-harvesting machine of claim 6 wherein the diverter is further controlled by the analyzer to divert peas that do not have the predetermined desired range of pea tenderness into the agricultural field.

9. The pea-harvesting machine of claim 6 wherein the chassis supports an operator cab and further including a display in the operator cab providing a real-time indication of pea tenderness from the analyzer based on the measurements from the infrared spectrometer.

10. The pea-harvesting machine of claim 9 further including a location sensing system providing a location of the chassis and wherein the display further provides a real-time mapping of the location of the harvesting machine with respect to a field map having superimposed pea tenderness values on the field map.

11. The pea-harvesting machine of claim 6 further including a stage positioned with respect to the infrared spectrometer for concentrating the flow of peas within a channel.

12. The pea-harvesting machine of claim 11 wherein the stage provides a funnel having a transparent wall and wherein the infrared spectrometer is positioned to make reflection measurements of the flow of peas through the transparent wall.

13. The pea-harvesting machine of claim 6 wherein the infrared spectrometer provides measurements in multiple frequency bands above and below 1100 nm and the analyzer applies a weighting to the multiple frequency bands above and below 1100 nm according to a predefined weighting system to produce an output indicating pea tenderness.

14. The pea-harvesting machine of claim 13 wherein the frequency bands include 980 nm and 1474 nm.

15. The pea-harvesting machine of claim 13 wherein the frequency bands include 980, 1050, 1096 nm.

16. The pea-harvesting machine of claim 6 wherein the weighting is determined empirically using regression to values of a mechanical pea tenderometer.

17. The pea harvesting machine of claim 16 wherein the output is Food Technology Corporation Tenderometer Units (TUs).

* * * * *